US011939954B2

(12) United States Patent
Stuart et al.

(10) Patent No.: US 11,939,954 B2
(45) Date of Patent: Mar. 26, 2024

(54) TRANSIT BRACKET ASSEMBLY FOR WIND TURBINE TOWER SECTION

(71) Applicants: William Stuart, Conroe, TX (US); Peter W. Stuart, Conroe, TX (US)

(72) Inventors: William Stuart, Conroe, TX (US); Peter W. Stuart, Conroe, TX (US)

(73) Assignee: BNSF Logistics, LLC, Springdale, AR (US)

( * ) Notice: Subject to any disclaimer, the term of this patent is extended or adjusted under 35 U.S.C. 154(b) by 44 days.

(21) Appl. No.: 17/463,678

(22) Filed: Sep. 1, 2021

(65) Prior Publication Data

US 2022/0099065 A1 Mar. 31, 2022

Related U.S. Application Data

(60) Provisional application No. 63/084,306, filed on Sep. 28, 2020.

(51) Int. Cl.
*F03D 13/40* (2016.01)
*B60P 7/12* (2006.01)

(52) U.S. Cl.
CPC .............. *F03D 13/40* (2016.05); *B60P 7/12* (2013.01); *F05B 2240/912* (2013.01); *F05B 2260/02* (2013.01)

(58) Field of Classification Search
CPC .... F03D 13/40; F03D 80/00; F05B 2240/912; F05B 2240/9113; F05B 2260/02; B60P 7/12; F16L 3/22; F16M 1/04
See application file for complete search history.

(56) References Cited

U.S. PATENT DOCUMENTS

| 8,690,140 | B2 | 4/2014 | Rasmussen et al. |
| 8,998,546 | B2 | 4/2015 | Fenger |
| 9,144,863 | B2 | 9/2015 | Pedersen |
| 9,260,875 | B2 | 2/2016 | Bjoernskov et al. |
| 10,323,623 | B2 | 6/2019 | Klein et al. |
| 10,753,339 | B2 | 8/2020 | Fenger |
| 2015/0003954 | A1* | 1/2015 | Koerner .................. E04H 12/34 294/67.1 |
| 2018/0111750 | A1* | 4/2018 | Klein ...................... F03D 13/40 |
| 2018/0178708 | A1 | 6/2018 | Stuart et al. |

FOREIGN PATENT DOCUMENTS

WO WO2011131254 A2 10/2011

OTHER PUBLICATIONS

International Search Report in PCT application PCT/US2021/059620 dated Feb. 4, 2022, which claims priority from U.S. Appl. No. 17/463,678 (the present application).

* cited by examiner

*Primary Examiner* — Christopher Verdier
*Assistant Examiner* — Michael K. Reitz
(74) *Attorney, Agent, or Firm* — Dan Brown Law Office; Daniel R. Brown (57) ABSTRACT

A bracket assembly for securing a tower section to a deck includes a lower support bracket, columns, and a pair of upper upper support brackets, which all have vertical plates with circular apertures. Each circular aperture spans at least two tower flange bolt holes. Attachment yokes are inserted into the circular apertures, and each have at least two bolt apertures, which match the bolt holes size and spacing. The yokes are rotated to align the holes for insertion of bolts. Specific yokes are provided to fit various tower sizes. The brackets can be stacked, and the yoke arrangement substantially reduces bolt torque requirements.

10 Claims, 8 Drawing Sheets

TRANSIT BRACKET ASSEMBLY FOR WIND TURBINE TOWER SECTION

RELATED APPLICATIONS

Priority claimed from U.S. provisional patent application Ser. No. 63/084,306 filed on 28 Sep. 2020.

BACKGROUND OF THE INVENTION

Field of the Invention

This disclosure relates to bracket assemblies for supporting cylindrical structures. More particularly, this disclosure relates to bracket assemblies employed in the transit and storage of wind turbine support tower sections.

Description of the Related Art

Support towers for wind turbines generally consist of plural tower sections in the form of cylindrical tubular sections, which include annular flanges having plural bolt hole apertures formed therethrough, which allow for on-site assembly. The individual tower sections are transported to the assembly site by ships, railcars, and trucks. During transit it is necessary to secure the tower sections to the particular mode of transportation.

The prior art employs support brackets that include elongated apertures through which bolts are inserted and joined with the tower sections. The bolts extend through the bolt holes in the tower section annular flanges. Nuts and washers are then attached to the bolts. A substantial amount of torque is required to secure the connections, for example up to sixty percent of the bolt material yield strength maybe needed to secure the bracket to the flange because circular apertures are formed in the brackets to accommodate several different diameters of bolts. The large amount of torque required increases the difficulty in assembly of the support brackets and may lead to failure of the bolts. Thus, it can be appreciated that there is a need in the art for a tower section support bracket and support system that does not use such a high level of torque to secure the tower section to the bracket assembly and to allow a single bracket assembly to be easily modified to accommodate a wide range of tower section sizes.

SUMMARY OF THE INVENTION

The need in the art is addressed by the apparatuses and methods of the present invention. The present disclosure teaches a bracket assembly for securing a tower section to a deck, where the tower section has a flange face with bolt holes along a bolt circle. The assembly includes a lower support bracket with a horizontal base for resting upon the deck, and a vertical plate extending upwardly, which has a proximal face for engaging the tower section flange face and a distal face. The vertical plate includes first and second circular apertures located to lie along the tower section bolt circle and each sized to span at least two of the bolt holes. The assembly also includes first and second attachment yokes, which each have a retention flange with a circular rim extending therefrom to a yoke face. The circular rims are sized to rotatably engage the circular apertures, such that the yoke faces lie flush with the proximal face of the vertical plate when the retention flanges engage the distal face. The attachment yokes have at least two bolt apertures sized and spaced to match the size and spacing of the bolt holes on the tower section. This enables alignment of the bolt apertures with the bolt holes by rotating the attachment yokes within the circular apertures, to thereby enable insertion of retention bolts to attach the tower section to the bracket assembly.

In a specific embodiment, the foregoing bracket assembly further includes first and second reinforcement members fixed to the vertical plate and disposed about the first and second circular apertures, respectively. In a refinement to this embodiment, the first and second reinforcement members are sections of steel pipe welded to the distal face of the vertical plate, which have a diameter greater than the first and second attachment yoke retention flanges.

In a specific embodiment of the foregoing bracket assembly, the first and second circular apertures are sized to span at least three bolt holes of the plurality of bolt holes, and the first and second attachment yokes have formed therethrough at least three bolt apertures which are spaced and arranged to conform to the spacing and arrangement of the bolt circle of the plurality of bolt holes in the tower section flange face.

In a specific embodiment of the foregoing bracket assembly, where the lower support bracket also includes first and second lower column attachment members at the left and right sides of the vertical plate, the bracket assembly further includes first and second vertical columns attached to the first and second lower column attachment members, respectively, which extend upwardly therefrom. And also includes first and second upper support brackets, which substantial mirror one-another. Each upper bracket includes an upper column attachment member for attachment to an upper portion of one of the first or second vertical columns, and an upper vertical plate extending inwardly from the upper column attachment member. The upper vertical plate has a proximal face for engaging the tower section flange face and a distal face. The upper vertical plate also includes an upper circular aperture located along the tower section bolt circle, and sized to span at least two bolt holes along the bolt circle. The upper bracket assembly also includes an upper attachment yoke, which has a retention flange with a circular rim extending to a yoke face, where the circular rim is sized to rotatably engage the upper circular aperture, and where the yoke face lies flush with the proximal face of the upper vertical plate while the retention flange engages the distal face. The upper attachment yoke has at least two bolt apertures sized and spaced to match the size and spacing of the two bolt holes spanned by the upper circular aperture, to thereby enable alignment of the bolt apertures with the bolt holes by rotation of the upper attachment yokes within the upper circular aperture for insertion of retention bolts to connect the flange face to the upper support bracket.

In a refinement to the foregoing bracket assembly, the first and second upper support brackets further include a reinforcement member fixed to the distal face of the upper vertical plate, disposed about the upper circular aperture. In a further refinement, the reinforcement member is a section of steel pipe welded to the distal face of the upper vertical plate, which has a diameter greater than the upper attachment yoke retention flange.

In a specific embodiment of the foregoing bracket assembly, the first and second lower column attachment members are sockets fitted to the vertical plate with open tops for insertion of the first and second columns. In a refinement to this embodiment, the sockets are fabricated from rectangle steel tubing.

In a specific embodiment, the foregoing bracket assembly further includes first and second turnbuckle eyelets fixed to the first and second upper support brackets and oriented inwardly toward one another, and a turnbuckle connected between the first and second turnbuckle eyelets, thereby enabling adjustment of tension forces between the first and second upper support brackets.

In a specific embodiment the foregoing bracket assembly, the first and second upper support brackets each include a stacking alignment rim around the perimeter of their top surface for guiding, receiving and supporting a second lower support bracket, which is substantially identical to the lower support bracket, to thereby enable stacking of two tower sections upon the bracket assembly.

The present disclosure teaches a method of securing a tower section to a deck, where the tower section has a flange face with bolt holes along a bolt circle, by utilizing a lower support bracket that has a horizontal base and an upwardly extending vertical plate that has proximal and distal faces, and where the vertical plate includes first and second circular apertures, and which utilizes first and second attachment yokes. The yokes each have a retention flange with a circular rim extending to a yoke face, where the first and second attachment yokes also have at least two bolt apertures sized and spaced to match the size and spacing of the bolt holes along the bolt circle. The method includes resting the horizontal base of the lower support bracket on the deck, and positioning the tower section such that the flange face of the tower section engages the proximal face of the lower support bracket, and such that the first and second circular apertures lie along the tower section bolt circle, each spanning at least two bolt holes. Then, engaging the rim of the first and second attachment yokes with the first and second circular apertures such that the yoke faces lies flush with the proximal face of the vertical plate while the retention flanges engages the distal face. And, rotating the first and second attachment yokes so that the bolt apertures in each align with the two bolt holes along the bolt circle, which thereby and thereby enables insertion of retention bolts.

In a refinement to the foregoing embodiment, where the lower support bracket includes first and second lower column attachment members attached to the left and right sides of the vertical plate, and further includes first and second vertical columns, and further includes first and second upper support brackets that substantial mirror one-another about a vertical centerline, which each include an upper column attachment member and an upper vertical plate with proximal and distal faces, wherein the upper vertical plate extends inwardly from the upper column attachment member, and wherein each upper vertical plate includes an upper circular aperture formed therethrough, and each includes an upper attachment yoke that has a retention flange with a circular rim extending to a yoke face, and where the upper attachment yoke has at least two bolt apertures sized and spaced to match the size and spacing of the bolt holes along the bolt circle, the method comprising the further steps of attaching the first and second vertical columns to the first and second lower column attachment members, respectively, such that they extend upwardly. Then, attaching the upper column attachment members to an upper potion of the left and right vertical columns, and positioning the tower section such that the flange face of the tower section engages the proximal face of the upper vertical plates, and such that the upper circular apertures lie along the tower section bolt circle, each spanning at least two bolt holes of the plurality of bolt holes. Then, engaging the rim of the upper attachment yokes with the upper circular apertures such that the yoke faces lies flush with the proximal faces of the upper vertical plates, respectively, while the retention flanges engages the distal faces, and rotating the upper attachment yokes so that the bolt apertures in each align with the bolt holes along the bolt circle, thereby enabling insertion of retention bolts therethrough.

In a refinement to the foregoing embodiment, where the first and second lower column attachment members are open top sockets fitted to the vertical plate, and where the upper column attachment members are open bottom sockets, the method further includes inserting the first and second columns into the open tops of the first and second lower column attachment members, respectively, and attaching the upper column attachment members to an upper portion of the left and right vertical columns, respectively.

In a specific embodiment of the foregoing method, where the first and second upper support brackets each include a turnbuckle eyelet fixed thereto, and the bracket assembly further includes a turnbuckle, the method further includes connecting the turnbuckle between the first and second turnbuckle eyelets, and adjusting tension forces between the first and second upper support brackets.

In a specific embodiment of the foregoing method, where the first and second upper support brackets include a stacking alignment rim disposed about a portion of a top surface perimeter thereof, the method further includes guiding, receiving and supporting a second lower support bracket, substantially identical to the lower support bracket, upon the first and second upper support brackets, and thereby enabling stacking of two tower sections upon the bracket assembly.

BRIEF DESCRIPTION OF THE DRAWINGS

For a detailed description of the illustrative embodiments of the present invention, reference will now be made to the accompanying drawings in which.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof, and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present teachings so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present disclosure claims priority to a provisional patent application, which disclosed a bracket assembly including a lower bracket assembly body with upper and lower support surfaces and a vertical plate extending between them. The vertical plate includes plural circular apertures that are adapted to receive a matching flange "disk yoke plug elements" that are pre-drilled to match, and be used with, a specified tower section that has a specified bolt circle diameter and bolt hole size in its circular flange. Hereinafter, these are also referred to as "attachment yokes". This novel design considerably reduces the amount of torque used to secure the tower section to the bracket assembly by virtue of the hope arrangement and rotatable engagement with the circular apertures. In practice, the bolts may be tightened to a snug condition which is attained with a few impacts of an impact wrench or the full efforts of a worker using an ordinary spud wrench. The use of circular apertures and the attachment yokes allows the bolts which fasten the bracket assemblies to the tower sections to act in unison in vector, in the manner of a yoke. In addition, a left and right pair upper support brackets with an additional lower bracket stacked on top of them may be used when it is desired to stack the tower sections as it will be discussed hereinafter. The bracket assembly system is a universal application in that individual attachment yokes may be fabricated and selected for insertion into the circular apertures according to the specific dimension of the tower section being transported.

More generally, the present disclosure teaches a wind turbine tower ocean-going transport system. This system is designed for transporting any variation of wind tower model or type. Each tower section is bolted to the transport bracket assembly by several cylindrical plates, called attachment yokes. These yokes are designed to balance the dynamic loads at the bolted connection across at least two bolts, and permits reuse of the bolts because of the lessened strain on any give bolt. The attachment yokes are the only additional cost required when introducing a new tower section with its own specific dimensions to the bracket assembly transport structure. The attachment yoke plate design eliminates the need for applying a high-torque to the bolts. The bracket assemblies rest upon the deck of the transportation vessel, such s a ship, or any of other deck surface, such as a dock or yard for storage prior to or after transportation.

In this disclosure, the relative location and directions of the several components are differentiated according to their relative location to one-another, and with respect to the common orientation at the earth's surface. In particular, horizontal means a surface orthogonal to the force of gravity, such as the surface of still water. Vertical is a direction parallel to the force of gravity, which is also orthogonal to the horizontal. The junction between a tower section flange face and a vertical surface of a bracket assembly mounting face attached thereto establishes a proximal-distal plane of reference where the proximal is closest to that junction and the distal is located away from that junction. With respect to a bracket assembly attached to a tower section, longitudinal axes are parallel to the longitudinal centerline of the tower section. A lateral axes lies orthogonal to both a longitudinal axis and a vertical axis. Also, the direction along any lateral axis may be expressed as a first lateral direction and a second lateral direction. Alternatively, a lateral direction may be expressed as 'left' and 'right', and such orientation is referenced to a view looking at the bracket assembly with the tower lying beyond along a longitudinal axis. With respect to such an end view of a bracket assembly, the location of a component or element thereof along a lateral axis may be described an "inward", meaning towards the vertical centerline of that bracket assembly, or "outward", meaning away from the vertical centerline of that bracket assembly.

Figure 1:
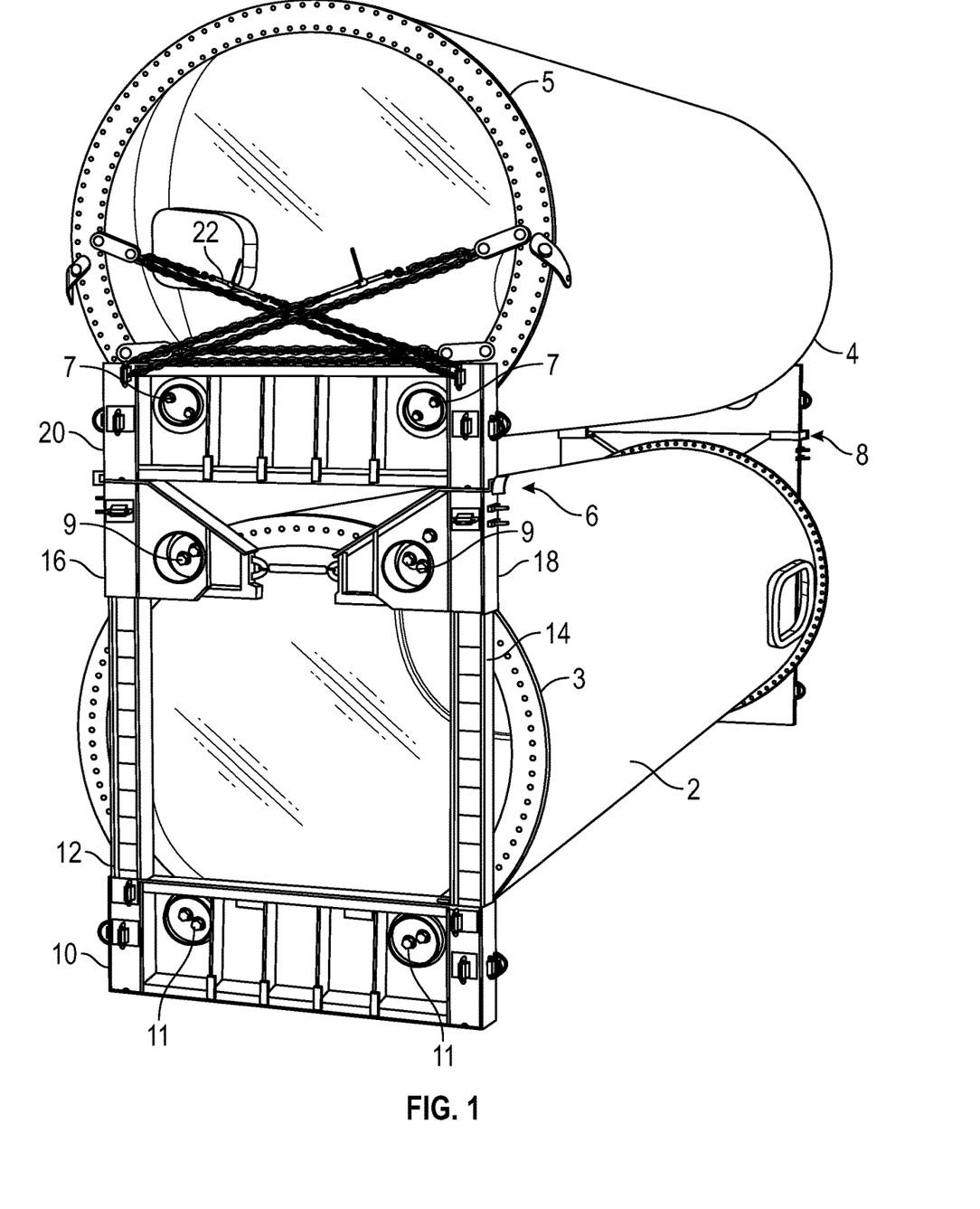
FIG. 1 is a perspective view drawing of a pair of wind turbine support tower sections stacked with transit bracket assembly according to an illustrative embodiment of the present invention.

Reference is directed to FIG. 1, which is a perspective view drawing of a pair of wind turbine support tower sections 2, 4 stacked within a pair of transit bracket assemblies 6, 8 according to an illustrative embodiment of the present invention. The pair of bracket assemblies 6, 8 are virtually identical, attaching to two ends of the tower sections 2, 4. Now considering the front bracket assembly 6 in FIG. 1, the assemblies comprises a first lower support bracket 10, a pair of vertical columns 12, 14, a pair of upper support brackets 16, 18, and a second lower support bracket 20, in stacked arrangement, as illustrated. The first lower support bracket 10 rests on a deck surface (not illustrated)

and includes a pair of circular apertures with attachment yokes inserted therein with bolts (collectively items 11) attaching them to the lower tower section 2 end flange 3. The pair of columns 12, 14 extend upwardly from the first lower support bracket 10 to engage and support a pair of upper support brackets 16, 18, as illustrated. Each of the upper support brackets 16, 18 also include a pair of circular apertures with attachment yokes inserted therein with bolts (collectively items 9) attaching them to the lower tower section 2 end flange 3. Thusly, the first lower support bracket 10 and the pair of upper support brackets 16, 18 support the near end of the lower tower section 2 along its attachment flange 3 using the circular apertures with attachment yokes inserted therein and bolts (items 9, 11).

The upper tower section 4 in FIG. 1 is supported by the second lower support bracket 20, which rests upon the top of the pair of upper support brackets 16, 18, as illustrated. The second lower support bracket 20 includes a pair of circular apertures with attachment yokes inserted therein with bolts (collectively items 7) attaching them to the upper tower section 4 end flange 5. Lashing fixtures, chains, and tensioners (collectively item 22) further secure the upper tower section 4 to the front bracket assembly 6, as illustrated. It is noted that where a non-stacking tower transport fixture arrangement is desired, only a single lower support bracket is required at each end of the tower. The initial dimensions of the lower and upper support brackets 10, 16. 18, 10 are chosen such that the accurately spaced circular apertures 7, 9, 11 line up with the plurality of bolt holes located in flange 3, 5 of the tower sections 2, 4.

Implementation of the bracket assemblies 6, 8 in FIG. 1 includes securing the tower sections 2, 4 to the lower brackets 10, 20 by position the tower sections with a lift, for example, such that at least two bolt holes in the flanges 3, 5 align with the circular apertures and attachment yokes 7, 11, and rotating the yokes so that the bolts holes in the flanges 3, 5, align, and similar alignment is accomplished for the pair of upper support brackets 16, 18 and their aperture/yokes 7. In this manner support bracket assembly 6, 8 are able to accommodate any one of the several sizes and patterns of flanges and bolt holes provided with various tower section sizes and manufacturers. It is noted that tower section flange diameters and bolt holes spacing will in all cases align with the centers of any two positioned circular apertures, which enables the attachment yokes to function as yokes, meaning to enable the plural bolts act in unison in carrying the resultant loads both static and dynamic.

Figure 2:
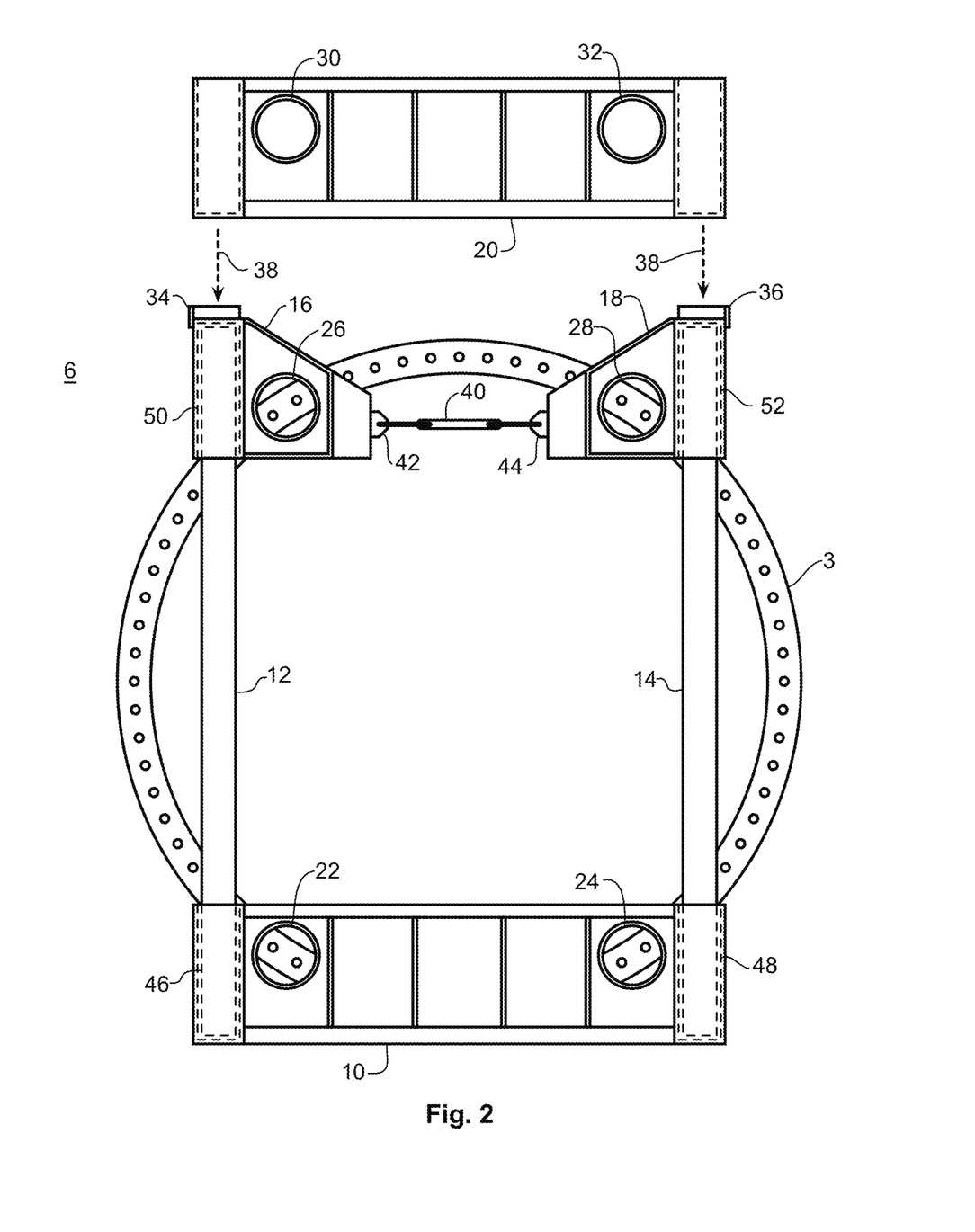
FIG. 2 is an end view drawing of a transit bracket assembly and tower section flange according to an illustrative embodiment of the present invention.

Reference is directed to FIG. 2, which is an end view drawing of a bracket assembly 6 and tower section flange 3 according to an illustrative embodiment of the present invention. The first lower support bracket 10 includes a pair of accurately spaced circular apertures 22, 24, which align along the tower section flange 3, as illustrated. A pair of column sockets 46, 48 are disposed on the left and right sides of the first lower support bracket 10 and receive first and second vertical columns 12, 14, respective, and as illustrated. The first upper support bracket 16 has a column socket 50 with receives the upper end of the first vertical column 12. Similarly, the second upper support bracket 18 has a column socket 52 with receives the upper end of the second vertical column 14. The left and right upper support brackets 16, 18, have corresponding circular apertures 26, 28, which are accurately located to lie along the tower section flange 3, as illustrated. It is within these circular apertures 22, 24, 26, and 28 that the aforementioned attachment yokes (not illustrated) are inserted. Thus, the lower and upper brackets 10, 16, 18 are secured to each other by the pair of support columns 12, 14 which are adapted to be positioned within the complimentary shaped sockets 46, 48, 50, and 52 as illustrated. Shims may be added (not illustrated) a the upper and lower ends of the columns 12, 14 to make small adjustments in the spacing between the first lower support bracket 10 and the pair of upper support brackets 16 18.

Horizontal upper surfaces of the upper support brackets 16, 18 have an alignment rim 34, 36, respectively, fixed about a portion of their perimeter. These rims 34, 36 serve to locate a second lower support bracket 20, which may be placed upon the upper support brackets 16, 18 when a stacked tower shipping arrangement is needed. The second upper support bracket 20 also includes a pair of circular apertures 30, 32 for receiving circular yokes (not illustrated), that enable attachment to the flange of a second tower section (not illustrated). The lower support bracket 10 and the upper support bracket 20 are typically identical to one another. If the upper tower section is tapered, then the upper tower section would be positioned so that opposite ends of the tower sections would be placed over each other to even out the height of the stack of a lower tower section and an upper tower section. Friction and resilient pads, such as neoprene pads, may be placed between upper support brackets 16, 18 and the lower support bracket 10 in the stacked orientation.

Figure 3A:
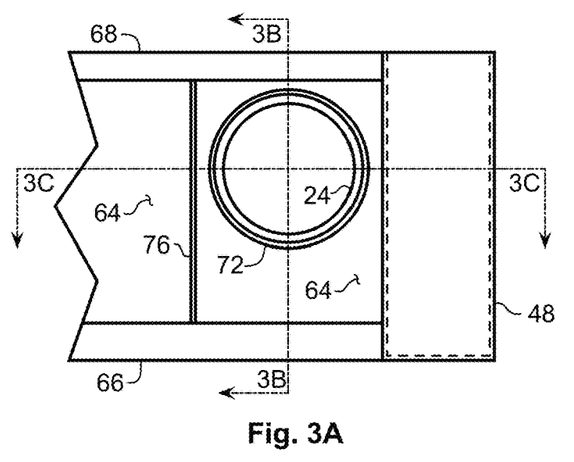
FIGS. 3A, 3B, and 3C are a partial end view drawing, a top view section drawing, and a side view section drawing, respectively of a lower bracket according to an illustrative embodiment of the present invention.
Figure 3B:
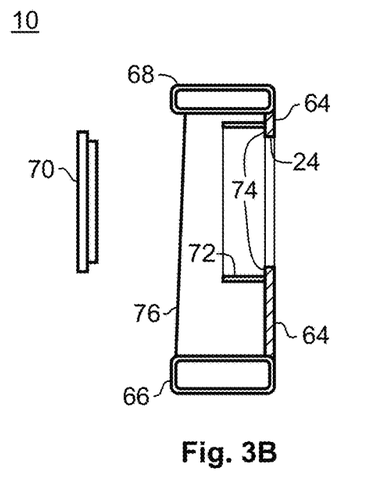
Figure 3C:
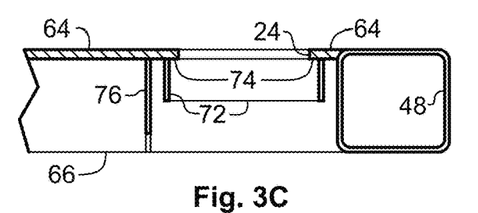

Reference is directed to FIGS. 3A, 3B, and 3C, which are a partial end view drawing, a top view section drawing, and a side view section drawing, respectively of a lower support bracket 10 according to an illustrative embodiment of the present invention. The bracket 10 includes a lower structural section 66 defining a horizontal base for resting on a deck, and an upper structural section 68 with a vertical plate 64 separating them, as illustrated. In the illustrative embodiment the structural sections 66, 68 are rectangular mild steel tubing, although other section shapes or fabricated plate could readily be employed. The vertical plate 64 has the circular aperture 24 formed therethrough for receiving the attachment yoke 70. One or more stiffening ribs 76 may be fixed between the lower structural section 66 and an upper structural section 68. The circular aperture is further reinforced with a stiffening member 72, which is a section is steel pipe in the illustrative embodiment. Note that the steel pipe 72 has sufficient internal diameter to yield an annular contact surface 74 for receiving and engaging the attachment yoke 70, which will be more fully discussed hereinafter. At each side of the lower support bracket 10, a column attachment member 48 is provided, which has an open upper end to receive the aforementioned vertical columns (not illustrated). This is also referred to as a column socket. In the illustrative embodiment the column socket 48 is a section of rectangular mild steel structural pipe.

Figure 4A:
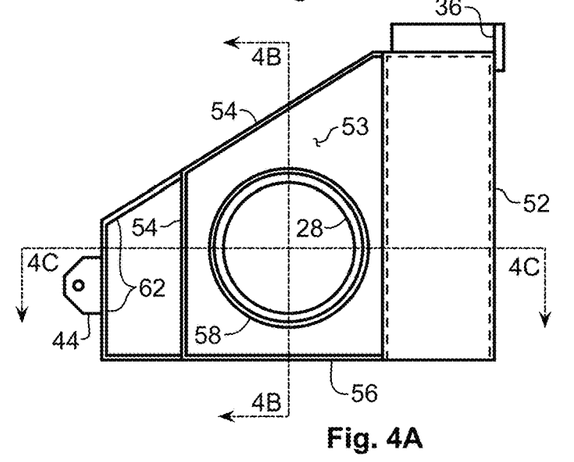
FIGS. 4A, 4B, and 4C are an end view drawing, a top view section drawing, and a side view section drawing, respectively of an upper bracket according to an illustrative embodiment of the present invention.
Figure 4B:
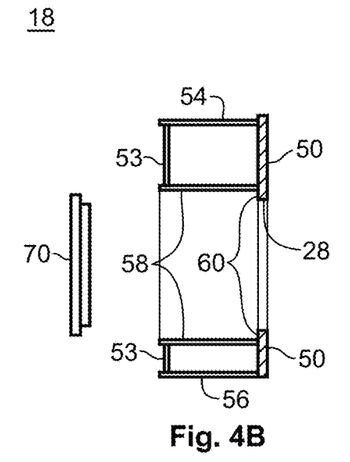
Figure 4C:
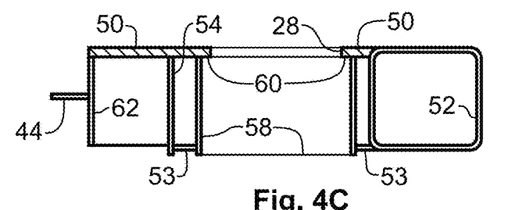

Reference is directed to FIGS. 4A, 4B, and 4C, which are an end view drawing, a top view section drawing, and a side view section drawing, respectively of an upper bracket 18 according to an illustrative embodiment of the present invention. This is a right side bracket 18, but note that the left side bracket (not illustrated) is substantially identical, although reflected through a vertical centerline. The upper support bracket 18 includes a lower horizontal plate 56, and an upper plate 54, as illustrated, with a vertical plate 50 separating them. The vertical plate 50 has the circular aperture 28 formed therethrough for receiving the attachment yoke 70. The circular aperture 28 is further reinforced with a stiffening member 58, which is a section is steel pipe in the illustrative embodiment. Note that the steel pipe 58 has sufficient internal diameter to yield an annular contact surface 60 for receiving and engaging the attachment yoke 70, which will be more fully discussed hereinafter. A second vertical plate 53 is provided to further stiffen the upper support bracket assembly 18. At one side of the lower support bracket 18, a column attachment member 52 is provided, which has an open lower end to receive the aforementioned vertical columns (not illustrated). This is also referred to as a column socket. In the illustrative embodiment the column socket 52 is a section of rectangular mild steel structural pipe. The upper support bracket 18 also includes a turnbuckle eyelet 44 for engaging a turnbuckle (not illustrated), as will be more fully discussed hereinafter. The upper horizontal surface of the column attachment member 52 has the aforementioned alignment rim 36 about a portion of its periphery.

Figure 5:
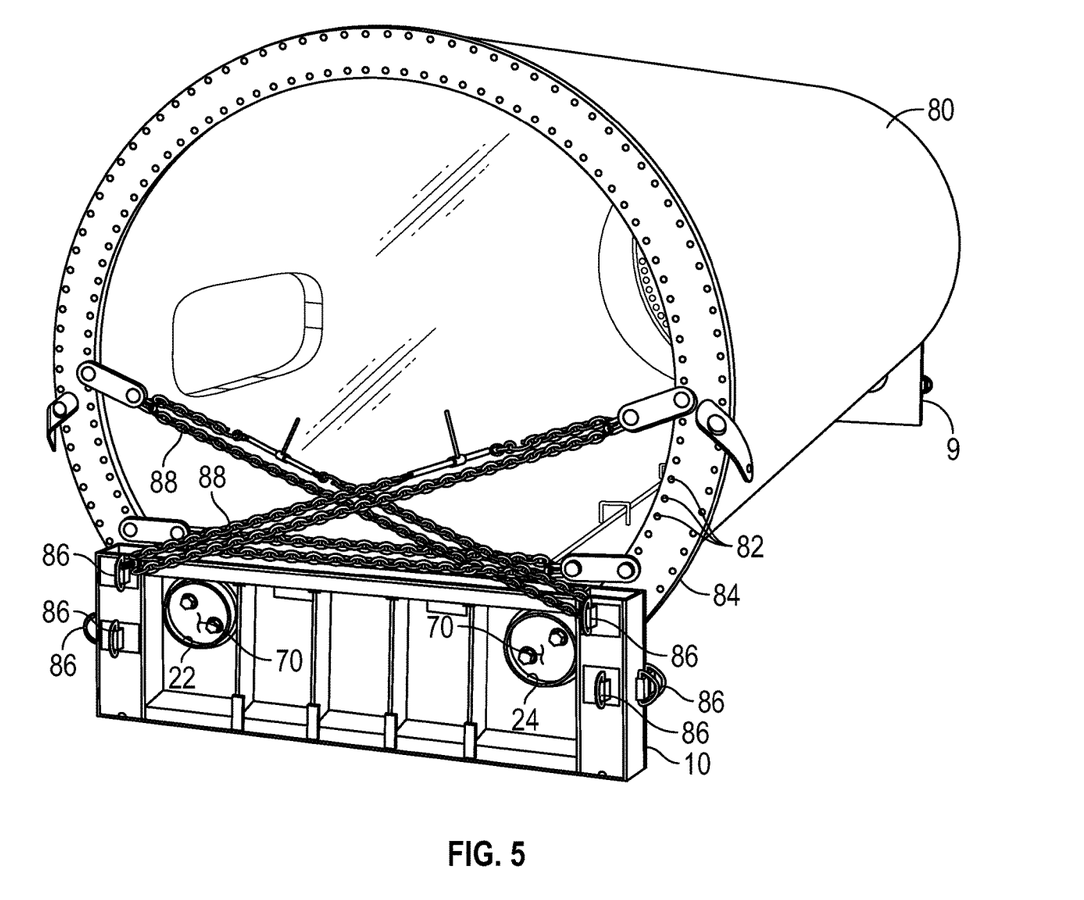
FIG. 5 is a perspective view drawing of a wind turbine tower section engaged with a pair of lower support brackets according to an illustrative embodiment of the present invention.

Reference is directed to FIG. 5, which is a perspective view drawing of a wind turbine tower section 80 engaged with a pair of lower support brackets 9, 10 according to an illustrative embodiment of the present invention. This is am embodiment where a single tower section 80 is to be transported or stored. The tower section has an end flange 84 with one or more bolt circlets 82 of bolt holes formed therethrough. While these are provided for assembly of a wind turbine tower, they are also useful for supporting the tower section 80 during transit. The pair of lower support brackets 9, 10 are attached to the tower section 80, and the near end bracket 10 will now be described, and it is understood that the far end bracket 9 is essentially identical. The a pair of circular apertures 22, 24 for formed throughout the bracket 10, and are fitted with a corresponding pair of attachment yokes and bolt sets 70. the bolts sets pass though both the attachment yoke and the tower flange bolt holes 82, facilitating the needed connection and support. Note that alignment of the bolt holes us essential in actual practice. Plural D-rings 86 are fitted to the bracket 10, providing lashing points as needed. Clashing fixates, chains, and tensioners 88 are added to secure the tower section 80 to the bracket assemblies 9, 10.

During use of the support brackets of the present disclosure, the attachment yokes are selected with holes and spacings that match the target tower section flange bolt circles and bolt holes. The attachment yokes are first placed all the way through circular apertures and fitted against the annular support surfaces of the vertical plates, bearing on an inner rim of the aperture yoke. A flange on the attachment yoke engages the annual support surface, presenting the face of the attachment yoke flush with the face of the vertical plate that engages the tower section flange surface. The attachment yoke is then rotated to align the yoke's bolt apertures with the bolt holes on the tower section flange, and bolt sets are inserted therethrough. This arrangement will be more fully developed hereinafter.

Figure 6A:
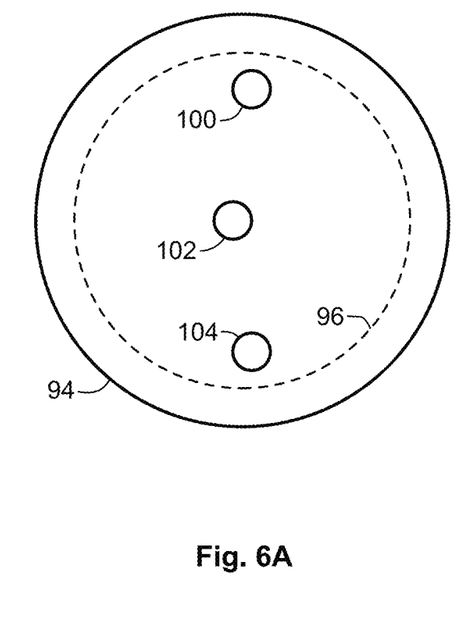
FIGS. 6A and 6B are an end view drawing and a side view drawing, respectively of a circular yoke according to an illustrative embodiment of the present invention.
Figure 6B:
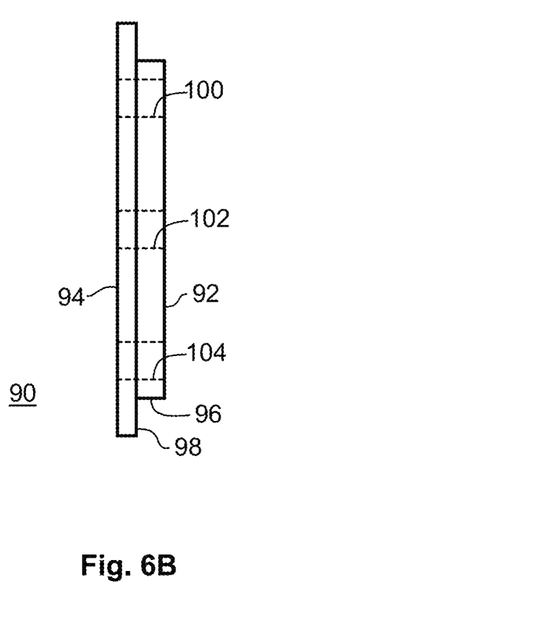

Reference is directed to FIGS. 6A and 6B, which are an end view drawing and a side view drawing, respectively of a circular attachment yoke 90 according to an illustrative embodiment of the present invention. In this embodiment, the yoke has three bolt apertures 100, 102, 104 that lie along an arc, spaced and sized to match that of the target flange bolt circle, hole spacing, and size. A flange 98 has a circular rim 96 extending therefrom to a yoke face 92. The bolt apertures 100, 102, 104 pass all the way through the attachment yoke 90. Note that the circular rim 96 is sized to fit within the target circular apertures (not illustrated) at reasonably close tolerances so as to be located therein without significant side-to-side play, but also to be rotatable therein. The tolerance of the fit of the attachment yoke to the circular aperture are such that the attachment yoke and the balanced spacing of the bolt apertures may be freely turned about its polar axis when fitted and bolted in the same manner that a bolt may turn. The amount of free displacement is small in rotation angle, but it prevents moment coupling at the connection and allows the bolts to act in unison as a team in aligning the vectors. In practice, the attachment yoke bearing surfaces and the sliding surface of the circular apertures are well lubricated. The result of this low friction and slack tolerance gap allows the bolts not to form a couple.

Figure 7A:
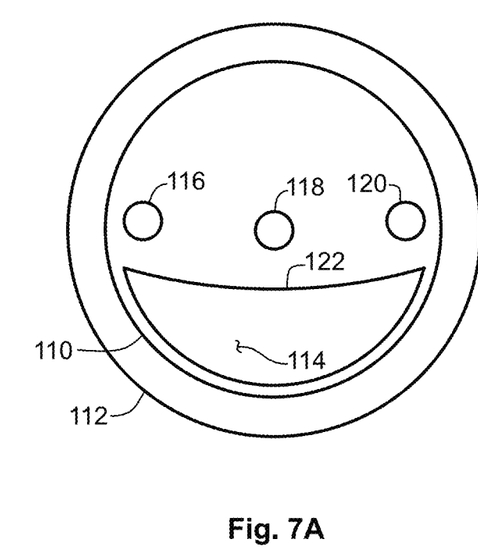
FIGS. 7A and 7B are an end view drawing and a side view drawing, respectively of a circular yoke according to an illustrative embodiment of the present invention.
Figure 7B:
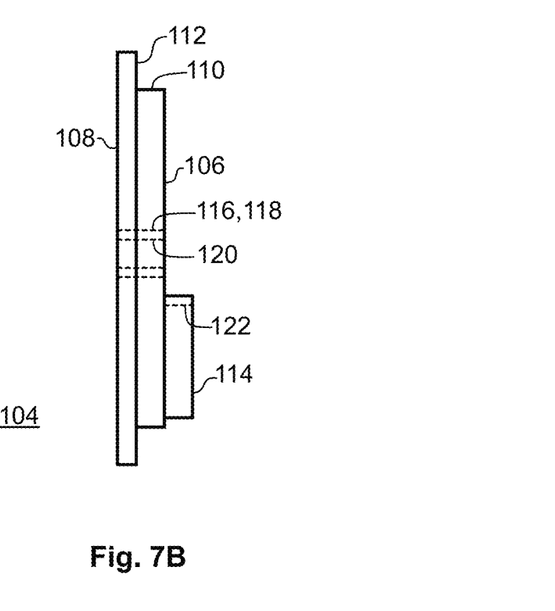

Reference is directed to FIGS. 7A and 7B, which are an end view drawing and a side view drawing, respectively of a circular attachment yoke 104 according to an illustrative embodiment of the present invention. This embodiment is similar to that in FIGS. 6A and 6B, but FIGS. 7A and 7B add an additional guide member 114. In the FIGS. 7A and 7B embodiment, the yoke 104 has three bolt apertures 116, 118, 120 that lie along an arc, spaced and sized to match that of the target flange bolt circle, hole spacing, and size. A flange 112 has a circular rim 110 extending therefrom to a yoke face 106. The bolt apertures 116, 118, 120 pass all the way through the attachment yoke 104. Note that the circular rim 110 is sized to fit within the target circular apertures (not illustrated) at reasonably close tolerances so as to be located therein without significant side-to-side play, but also to be rotatable therein. An additional guide plate 114 is fixed to the face 106 of the yoke 104, and provides an arcuate edge 122 that is sized to match the outside diameter of the target tower section attachment flange (not illustrated). This enables a portion of the load borne by the attachment yoke 104 to be coupled directly from the tower section flange to the inside diameter if the circular aperture (not illustrated) in the the support fixture (not illustrated). The guide plate also increases the strength of the attachment code against static and dynamic shear forces.

It is noted that the circular aperture and attachment yoke bearing surfaces can, and do, slide with respect to one-another. And, it may appear obvious that all the shear forces would be are borne by the attachment bolts. However, note that the attachment yoke and tower section travel is limited to the circular aperture that the attachment yoke is captured by. That is, the rim of the attachment yoke rests and bears on the inside edge of the circular aperture. The resultant forces are carried by the bolts in shear to the attachment yokes, and that the attachment yoke rim can rest on any point of the aperture circular interior edge. This would begin at the 6 o'clock position when unit is under static gravity loads, but when ship motions occur during transit, the circular yoke inner rim contact point changes to align with the resultant vector of the forces and can engage at any of the clock positions. An analogy would be that of a planetary gear assembly with the planet gears rotating about around the outer ring gear. The circular aperture edge is analogous to the ring gear, and the attachment yoke rim is analogous to the planet gear. The difference in diameter is just about six millimeters in a typical application. and the action is a sliding contact which is importantly and demonstratively free to turn on the polar axis of the attachment yoke and tower section in relation to the support brackets albeit by very small angles. The flange of the attachment yoke against the annual surface about the circular aperture provides the bearing that resists longitudinal movement of the tower section as the tower section is being pulled away from the support bracket by motion of the ship and its deck, which are forces principally in pitch and surge. On a specific embodiment the aforementioned guide plate (item 114 in FIGS. 7A and 7B) assists in carrying the tower section load direct to the vertical plate in the support brackets, and dramatically reduces the attachment bolt loads on supporting the tower tower section.

Figure 8:
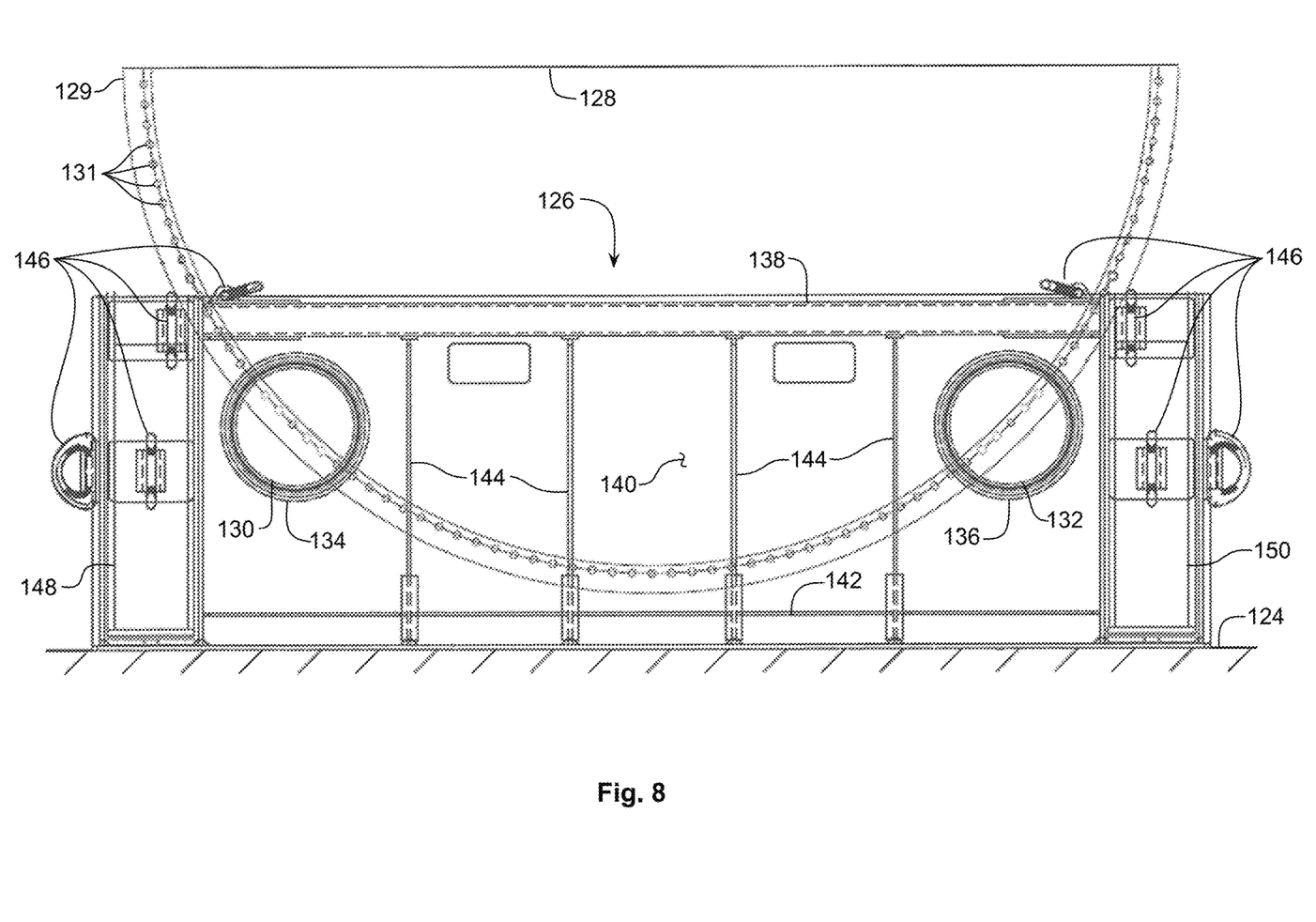
FIG. 8 is an end view drawing of a lower support bracket and a tower section flange according to an illustrative embodiment of the present invention.

Reference is directed to FIG. 8, which is an end view drawing of a lower support bracket 126 and a tower section 128 flange 129 according to an illustrative embodiment of the present invention. The tower section flange 129 has a plurality of bolt holes 131 located along about circle, with the bolt holes 131 having a known diameter for a specified bolt size, as will be appreciated by those skilled in the art. The lower support bracket 126 has a vertical plate 140 with two circular apertures 130, 132 formed therethrough. Each of these apertures 130, 132 are surrounded by a stiffening member 134, 136, respectively, which are sections of steel pipe in the illustrative embodiment. The circular apertures 130, 132 are accurately located within the vertical plate 140 to lie along a portion of the plurality of bolt holes 131 on the tower section 128 flange 129. In use, a pair of attachment yokes (not illustrated) would be inserted into the circular apertures 130, 132, and the yokes would be rotated to align their bolt apertures with the bolt holes 131, and bolt sets (not illustrated) would be inserted therethrough and tightened in place.

The lower support bracket 126 in FIG. 8 further illustrates that the frame includes a lower horizontal structural member 142 for resting upon a deck surface 124, which as a ship, barge, land vehicle, or a storage yard. The lower support bracket 126 also includes an upper horizontal structural member 138. Both horizontal members 138, 142 may be rectangular steel structural tubes. At both the left and right sides of the bracket 126 are column attachment members 148, 150 in the form of rectangular steel tubing sockets. Plural reinforcing ribs 144 are welded to the vertical plate 140, as well as the upper and lower horizontal structural members 138, 142 to stiffen the overall structure as required from a structural design perspective. Plural D-ring attachment points 146 are provided as lashing securement points, as illustrated.

Figure 9:
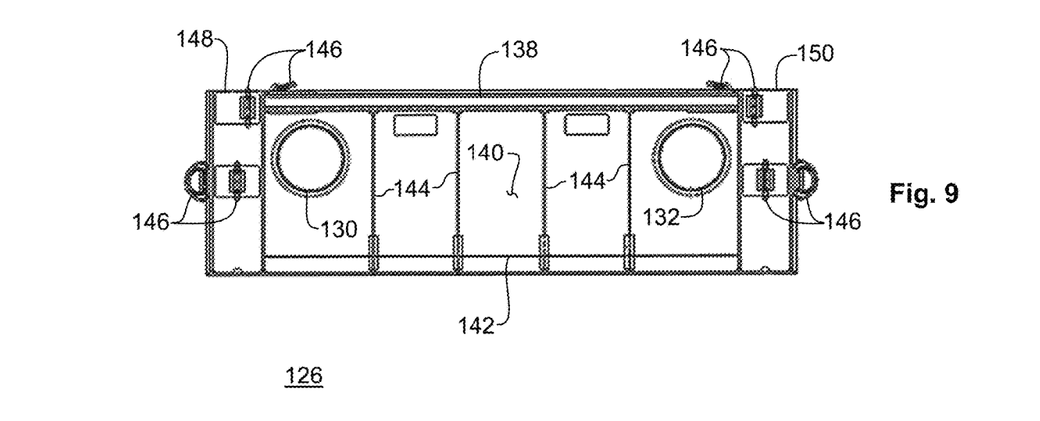
FIG. 9 is an end view drawing of a lower support bracket according to an illustrative embodiment of the present invention.

Reference is directed to FIG. 9, which is an end view drawing of a lower support bracket 126 according to an illustrative embodiment of the present invention. The lower support bracket 126 has a vertical plate 140 with two circular apertures 130, 132 formed therethrough. The lower support bracket 126 includes a lower horizontal structural member 142 for resting upon a deck surface. The lower support bracket 126 also includes an upper horizontal structural member 138. Both horizontal members 138, 142 may be rectangular steel structural tubes. At both the left and right sides of the bracket 126 are column attachment members 148, 150 in the form of rectangular steel tubing sockets. Plural reinforcing ribs 144 are welded to the vertical plate 140, as well as the upper and lower horizontal structural members 138, 142 to stiffen the overall structure as required from a structural design perspective. Plural D-ring attachment points 146 are provided as lashing securement points, as illustrated.

Figure 10:
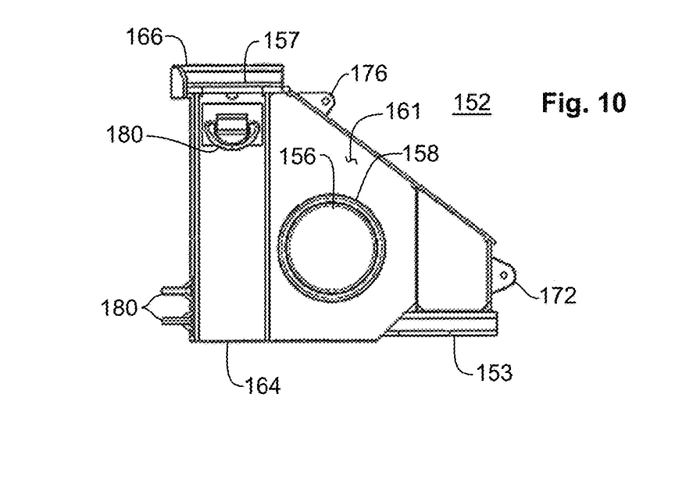
FIG. 10 is an end view drawing of an upper-left support bracket according to an illustrative embodiment of the present invention.
Figure 11:
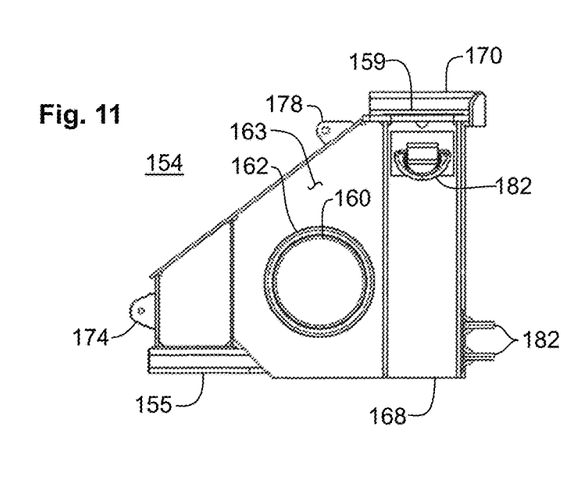
FIG. 11 is an end view drawing of an upper-right support bracket according to an illustrative embodiment of the present invention.

Reference is directed to FIG. 10 and FIG. 11, which are end view drawing of an upper-left support bracket 152 and an upper right support bracket 154 according to an illustrative embodiment of the present invention. Note that these brackets 152, 152 are substantially identical except that they mirror one another about a vertical centerline, as illustrated. The upper support brackets 152, 154 perform a similar function to lower support bracket (item 126 in FIG. 9). The upper support brackets 152, 154 include a lower horizontal plates 153, 155, and an upper plates 157, 159, as illustrated, with a vertical plates 161, 163 separating them. The vertical plates 161, 163 have the circular apertures 156, 160 formed therethrough for receiving the aforementioned attachment yokes (not illustrated). The circular apertures 158, 160 are further reinforced with stiffening members 158, 162, which are sections is steel pipe in the illustrative embodiment. At the outboard side of each lower support bracket 152,154 are column attachment members 164, 168, which have an open lower end to receive the aforementioned vertical columns (not illustrated). These are also referred to as a column sockets. In the illustrative embodiment the column sockets 164, 168 are sections of rectangular mild steel structural pipe. The upper support brackets 152, 154 also include turnbuckle eyelets 172, 174 for engaging a turnbuckle (not illustrated). The upper horizontal plates 157, 159 of the column attachment members 164, 168 have alignment rims 166, 170 about a portion of their peripheries.

Figure 12:
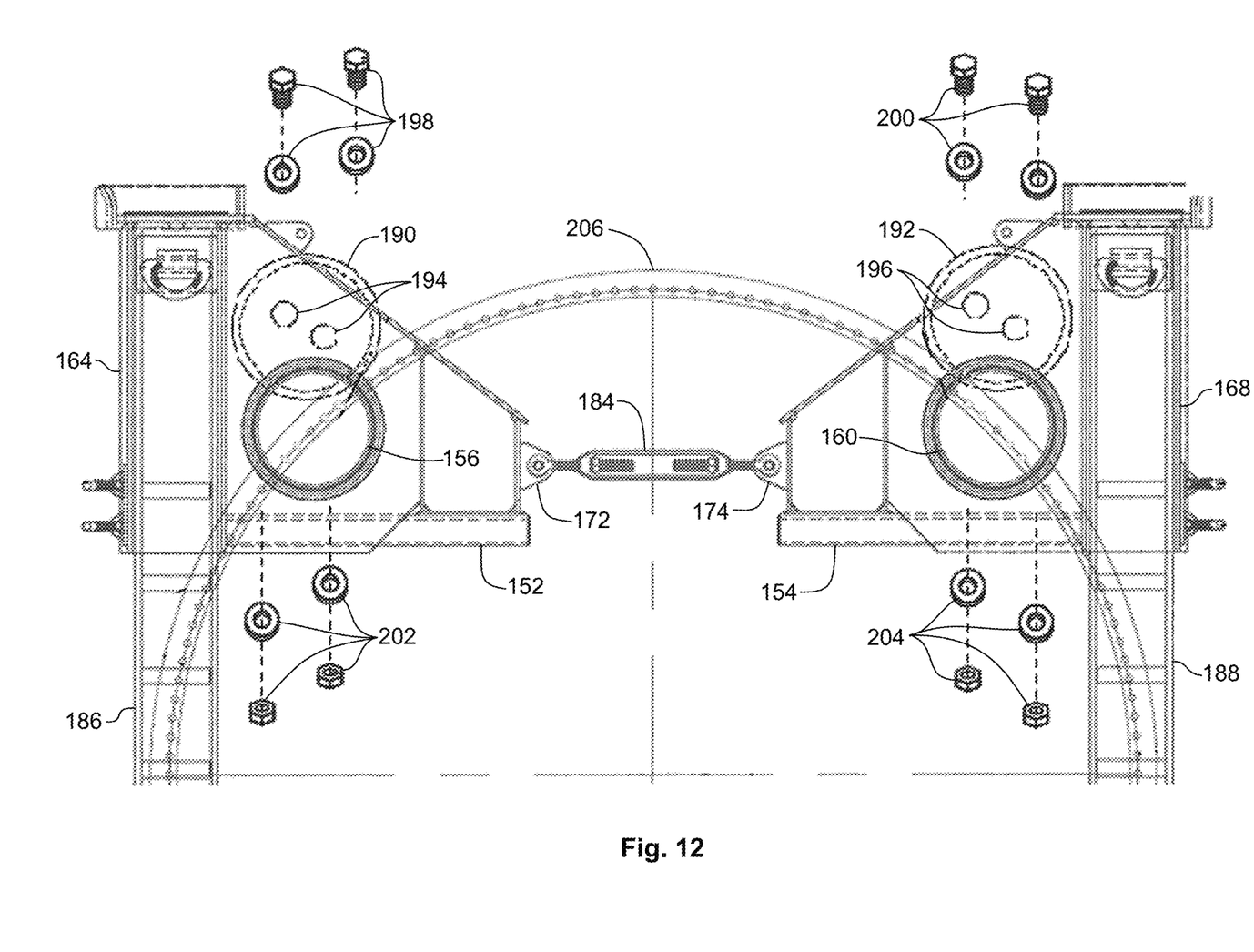
FIG. 12 is an end view drawing of a pair of upper support brackets and tower section flange according to an illustrative embodiment of the present invention.

Reference is directed to FIG. 12, which is an end view drawing of a pair of upper support brackets 152, 154 and tower section flange 206 according to an illustrative embodiment of the present invention. The upper support brackets 152, 154 are supported by vertical support columns 186, 188, respectively, which slide into and engage column sockets 164, 168, respectively, as illustrated. The left and right upper support brackets 152, 154 have circular apertures 156, 160 formed therethrough, respectively. circular attachment yokes 190, 192 (not drawn to scale) are inserted into the circular apertures 156, 160, respectively, and are then rotated to align the bolt apertures 194, 196 with bolt holes in the tower section flange 206. Once aligned, bolt, washer, and nut sets s198, 202, 200, and 204 are inserted therethrough and tightened to secure the tower section to the upper support brackets 152, 154. A turnbuckle 184 is attached to turnbuckle eyelets 172, 174 on the left and right brackets 152, 154, respectively. The turnbuckle 184 is then tightened to draw the tow upper support brackets 152, 154 into equilibrium without deformation of the tower flange 206.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A bracket assembly for securing a tower section to a deck, the tower section having a flange face with a plurality of bolt holes along a bolt circle, the assembly comprising:
   a lower support bracket having a horizontal base for resting upon the deck, and having a vertical plate extending upwardly therefrom, the vertical plate having a proximal face for engaging the tower section flange face and a distal face, and wherein said vertical plate includes first and second circular apertures formed therethrough, both located to lie along the tower section bolt circle and each sized to span at least two bolt holes of the plurality of bolt holes, and
   first and second attachment yokes, each having a retention flange with a circular rim extending therefrom to a yoke face, wherein said circular rims are sized to rotatably engage said first and second circular apertures, and wherein said yoke faces lies flush with said proximal face of said vertical plate while said retention flanges engage said distal face, and wherein said first and second attachment yokes have formed therethrough at least two bolt apertures sized and spaced to match the size and spacing of the at least two bolt holes spanned by said first and second circular apertures, to thereby enable alignment of said bolt apertures with the bolt holes by rotation of said first and second attachment yokes within said first and second circular apertures, to thereby enable insertion of retention bolts therethrough, and first and second sections of steel pipe welded to said vertical plate as reinforcement members, and disposed about said first and second circular apertures, respectively, and each having a diameter greater than said first and second attachment yoke retention flanges.

2. The bracket assembly of claim 1, and wherein:

said first and second circular apertures are sized to span at least three bolt holes of the plurality of bolt holes, and wherein said first and second attachment yokes have formed therethrough at least three bolt apertures which are spaced and arranged to conform to the spacing and arrangement of the bolt circle of the plurality of bolt holes in the tower section flange face.

3. The bracket assembly of claim 1, and wherein said lower support bracket further includes first and second lower column attachment members disposed about left and right sides of said vertical plate, the bracket assembly further comprising a. first and second vertical columns attached to said first and second lower column attachment members, respectively, and extending upwardly therefrom;

b. first and second upper support brackets, which mirror one-another about a vertical centerline, and wherein each further comprises:

i. an upper column attachment member for attachment to an upper portion of one of said first or second vertical columns;

ii. an upper vertical plate extending inwardly from said upper column attachment member, said upper vertical plate having a proximal face for engaging the tower section flange face and a distal face, and wherein said upper vertical plate includes an upper circular aperture formed therethrough, located to lie along the tower section bolt circle and sized to span at least two bolt holes of the plurality of bolt holes, and iii. an upper attachment yoke, having a retention flange with a circular rim extending therefrom to a yoke face, wherein said circular rim is sized to rotatably engage said upper circular aperture, and wherein said yoke face lies flush with said proximal face of said upper vertical plate while said retention flange engages said distal face, and wherein said upper attachment yoke has formed therethrough at least two bolt apertures sized and spaced to match the size and spacing of the at least two bolt holes spanned by said upper circular aperture, to thereby enable alignment of said bolt apertures with the bolt holes by rotation of said upper attachment yokes within said upper circular aperture for insertion of retention bolts therethrough.

4. The bracket assembly of claim 3, and wherein:

said first and second lower column attachment members are sockets fitted to said vertical plate having open tops for insertion of said first and second columns thereinto.

5. The bracket assembly of claim 4, and wherein:

said sockets are fabricated from rectangle steel tubing.

6. The bracket assembly of claim 3, and further comprising:

first and second turnbuckle eyelets fixed to said first and second upper support brackets and oriented inwardly toward one another, and a turnbuckle connected between said first and second turnbuckle eyelets, thereby enabling adjustment of tension forces between said first and second upper support brackets.

7. The bracket assembly of claim 3, and wherein said first and second upper support brackets each further comprise:

a stacking alignment rim disposed about a top surface perimeter thereof, for guiding, receiving and supporting a second lower support bracket, identical to said lower support bracket, thereupon, to thereby enable stacking of two tower sections upon the bracket assembly.

8. A method of securing a tower section to a deck, the tower section having a flange face with a plurality of bolt holes along a bolt circle, by utilizing a lower support bracket with a horizontal base and a vertical plate extending upwardly therefrom, the plate having proximal and distal faces, and where the vertical plate includes first and second circular apertures formed therethrough, and utilizing first and second attachment yokes that each have a retention flange with a circular rim extending therefrom to a yoke face, and wherein the first and second attachment yokes have at least two bolt apertures sized and spaced to match the size and spacing of the bolt holes along the bolt circle, and wherein the lower support bracket further includes first and second lower column attachment members disposed about left and right sides of the vertical plate, and wherein the bracket assembly further includes first and second vertical columns, and first and second upper support brackets that mirror one-another about a vertical centerline, and which each include an upper column attachment member and an upper vertical plate with proximal and distal faces, wherein the upper vertical plate extends inwardly from the upper column attachment member, and wherein each upper vertical plate includes an upper circular aperture formed therethrough, and each includes an upper attachment yoke that has a retention flange with a circular rim extending therefrom to a yoke face, and where the upper attachment yoke has at least two bolt apertures sized and spaced to match the size and spacing of the bolt holes along the bolt circle, and wherein the first and second upper support brackets each further include a turnbuckle eyelet fixed thereto, and the bracket assembly further includes a turnbuckle, the method comprising the steps of:

resting the horizontal base of the lower support bracket on the deck;

positioning the tower section such that the flange face of the tower section engages the proximal face of the lower support bracket, and such that the first and second circular apertures lie along the tower section bolt circle, each spanning at least two bolt holes of the plurality of bolt holes;

engaging the rim of the first and second attachment yokes with the first and second circular apertures such that the yoke faces lies flush with the proximal face of the vertical plate while the retention flanges engages the distal face;

rotating the first and second attachment yokes such that the at least two bolt apertures in each align with the at least two bolt holes along the bolt circle, and thereby enabling insertion of retention bolts therethrough attaching the first and second vertical columns to the first and second lower column attachment members, respectively, such that they extend upwardly;

attaching the upper column attachment members of the upper support bracket to an upper potion of the left and right vertical columns;

connecting the turnbuckle between the first and second turnbuckle eyelets, and adjusting tension forces between the first and second upper support brackets;

positioning the tower section such that the flange face of the tower section engages the proximal face of the upper vertical plates, and such that the upper circular apertures lie along the tower section bolt circle, each spanning at least two bolt holes of the plurality of bolt holes;

engaging the rim of the upper attachment yokes with the upper circular apertures such that the yoke faces lies flush with the proximal faces of the upper vertical plates, respectively, while the retention flanges engages the distal faces;

rotating the upper attachment yokes such that the at least two bolt apertures in each align with the at least two bolt holes along the bolt circle, and thereby enabling insertion of retention bolts therethrough.

9. The method of claim 8, and wherein the first and second lower column attachment members are sockets fitted to the vertical plate, and have open tops, and wherein the upper column attachment members are sockets, and have open bottoms, and further comprising the steps of:

inserting the first and second columns into the open tops of the first and second lower column attachment members, respectively, and attaching the upper column attachment members to an upper portion of the left and right vertical columns, respectively.

10. The method of claim 8, and wherein the first and second upper support brackets each further include a stacking alignment rim disposed about a portion of a top surface perimeter thereof, and further comprising the steps of:

guiding, receiving and supporting a second lower support bracket, identical to said lower support bracket, upon the first and second upper support brackets, and thereby enabling stacking of two tower sections upon the bracket assembly.

* * * * *